(12) United States Patent
Luo et al.

(10) Patent No.: US 10,440,743 B2
(45) Date of Patent: Oct. 8, 2019

(54) METHOD FOR ADJUSTING CLEAR CHANNEL ASSESSMENT CCA THRESHOLD, AND DEVICE

(71) Applicant: HUAWEI TECHNOLOGIES CO., LTD., Shenzhen, Guangdong (CN)

(72) Inventors: Jun Luo, Shanghai (CN); Jiyong Pang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 181 days.

(21) Appl. No.: 15/446,314

(22) Filed: Mar. 1, 2017

(65) Prior Publication Data
US 2017/0181189 A1    Jun. 22, 2017

Related U.S. Application Data

(63) Continuation of application No. PCT/CN2014/085768, filed on Sep. 2, 2014.

(51) Int. Cl.
*H04W 74/08*   (2009.01)
*H04W 24/08*   (2009.01)
*H04W 88/02*   (2009.01)
*H04W 88/08*   (2009.01)

(52) U.S. Cl.
CPC ........... *H04W 74/08* (2013.01); *H04W 24/08* (2013.01); *H04W 88/02* (2013.01); *H04W 88/08* (2013.01)

(58) Field of Classification Search
CPC ..... H04W 74/08; H04W 24/08; H04W 88/02; H04W 88/08
See application file for complete search history.

(56) References Cited

U.S. PATENT DOCUMENTS

| 8,917,705 | B2 | 12/2014 | Merlin et al. |
| 2006/0046739 | A1 | 3/2006 | Blosco et al. |
| 2007/0270102 | A1 | 11/2007 | Zhu et al. |

(Continued)

FOREIGN PATENT DOCUMENTS

| CN | 103220065 A | 7/2013 |
| CN | 103843443 A | 6/2014 |
| WO | WO2012128505 | 9/2012 |

OTHER PUBLICATIONS

Extended European Search Report, dated Jul. 31, 2017, in European Application No. 14901148.8 (7 pp.).

(Continued)

*Primary Examiner* — Jung H Park
(74) *Attorney, Agent, or Firm* — Staas & Halsey LLP

(57) ABSTRACT

A method includes: determining, by an AP from all STAs associated with the AP, a concurrent STA joining a concurrent group, and generating concurrent group information of the concurrent group; and sending the concurrent group information to another AP in a system other than the AP, so that a BSS to which the another AP belongs determines, according to the concurrent group information, to join the concurrent group, to eventually form the concurrent group. All concurrent STAs that are associated with the AP and that join the concurrent group perform channel contention within a concurrent time by using an increased target CCA threshold, to increase a possibility that the concurrent STAs send data, so that a system throughput is improved.

18 Claims, 7 Drawing Sheets

(56) References Cited

U.S. PATENT DOCUMENTS

| | | | |
|---|---|---|---|
| 2008/0008133 A1 | 1/2008 | Zhu et al. | |
| 2009/0129353 A1 | 5/2009 | Ki et al. | |
| 2012/0294142 A1* | 11/2012 | Kneckt | H04W 74/002 |
| | | | 370/229 |
| 2013/0210435 A1* | 8/2013 | Dimou | H04W 36/0083 |
| | | | 455/436 |
| 2013/0294354 A1* | 11/2013 | Zhang | H04W 72/04 |
| | | | 370/329 |
| 2014/0010089 A1* | 1/2014 | Cai | H04W 48/16 |
| | | | 370/241 |

OTHER PUBLICATIONS

International Search Report dated May 28, 2015 in corresponding to International Application PCT/CN2014/085768.
Written Opinion of the International Searching Authority dated May 28, 2015 in corresponding to International Application PCT/CN2014/085768.
International Search Report, dated May 28, 2015, in International Application No. PCT/CN2014/085768 (4 pp.).

* cited by examiner

| Identifier of a concurrent group | Identifier of an AP 1 | Concurrent STA associated with the AP 1 | ... | Concurrent time |
|---|---|---|---|---|

FIG. 4

| Identifier of a concurrent group | Identifier of an AP 1 | Identifier of an AP 2 | ... |
|---|---|---|---|

FIG. 5

| A STA receives a notification message sent by an AP, where the STA is a concurrent STA associated with the AP, the notification message is sent by the AP to the STA after the AP determines that the STA joins a concurrent group, and the notification message includes a concurrent time of the concurrent group and a target CCA threshold of the STA | 301 |

| The STA performs channel contention according to the notification message within the concurrent time by using the target CCA threshold | 302 |

FIG. 6

METHOD FOR ADJUSTING CLEAR CHANNEL ASSESSMENT CCA THRESHOLD, AND DEVICE

CROSS-REFERENCE TO RELATED APPLICATIONS

This application is a continuation of International Application No. PCT/CN2014/085768, filed on Sep. 2, 2014, the disclosure of which is hereby incorporated by reference in its entirety.

TECHNICAL FIELD

The present invention relates to the communications technologies, and in particular, to a method for adjusting a clear channel assessment (Clear Channel Assessment. CCA for short) threshold, and a device.

BACKGROUND

Due to advantages of high rate and low costs of a wireless local area network (WLAN for short), the wireless local area network becomes one of mainstream mobile broadband access technologies nowadays. A Media Access Control (MAC for short) layer of an existing WLAN performs data transmission by using a contention mechanism of carrier sense multiple access with collision avoidance (CSMA/CA for short). A sending node monitors energy of a channel before sending data. If the energy of the channel exceeds a CCA threshold, it is considered that the channel is busy. If the energy of the channel is less than the CCA threshold, it is considered that the channel is clear. When the channel is clear, the sending node performs channel contention. To increase a data thoughput rate of a WLAN system, the CCA threshold may be increased, to increase a possibility of link transmission. However, in an actual communications system, increasing the CCA threshold may, instead, reduce a system throughput.

SUMMARY

Embodiments of the present invention provide a method for adjusting a clear channel assessment CCA threshold, and a device, so as to improve a system throughput.

A first aspect of the present invention provides a method for adjusting a clear channel assessment CCA threshold, including:

determining, by an access point AP from all stations STAs associated with the AP, a concurrent STA joining a concurrent group, and generating concurrent group information of the concurrent group, where the concurrent group information includes an identifier of the AP, an identifier of the concurrent STA associated with the AP, and a concurrent time of the concurrent group:

sending, by the AP, a notification message to the concurrent STA associated with the AP, where the notification message includes the concurrent time and a target CCA threshold of the concurrent STA associated with the AP, and the notification message is used to instruct the concurrent STA associated with the AP to perform channel contention within the concurrent time by using the target CCA threshold; and sending, by the AP, the concurrent group information to another AP in a system other than the AP.

With reference to the first aspect of the present invention, in a first possible implementation manner of the first aspect of the present invention, the determining, by an AP from all stations STAs associated with the AP, a concurrent STA joining a concurrent group includes:

measuring, by the AP, received signal strengths from all the STAs associated with the AP to the AP; and selecting, by the AP, one or more STAs with highest received signal strengths from all the STAs associated with the AP as the concurrent STA of the AP.

With reference to the first aspect of the present invention or the first possible implementation manner of the first aspect of the present invention, in a second possible implementation manner of the first aspect of the present invention, the concurrent group information further includes a maximum concurrent service set quantity, where the maximum concurrent service set quantity is used to instruct the another AP to stop joining the concurrent group when the another AP determines that a quantity of service sets that have already joined the concurrent group reaches the maximum concurrent service set quantity.

With reference to the first aspect of the present invention or the first or the second possible implementation manner of the first aspect of the present invention, in a third possible implementation manner of the first aspect of the present invention, the concurrent group information further includes an identifier of the concurrent group.

A second aspect of the present invention provides a method for adjusting a clear channel assessment CCA threshold, including:

receiving, by a first access point AP, concurrent group information of a concurrent group, where the concurrent group information includes: an identifier of each second AP that has already joined the concurrent group, an identifier of a concurrent station STA associated with each second AP, and a concurrent time of the concurrent group;

determining, by the first AP according to the identifier, which is indicated by the concurrent group information, of the concurrent STA associated with each second AP, whether to join the concurrent group;

if the first AP determines to join the concurrent group, determining, by the first AP from all STAs associated with the first AP, according to the identifier of each second AP, a concurrent STA joining the concurrent group;

sending, by the first AP, a notification message to the concurrent STA associated with the AP, where the notification message includes the concurrent time and a target CCA threshold of the concurrent STA associated with the first AP, and the second notification message is used to instruct the concurrent STA associated with the first AP to perform channel contention within the concurrent time by using the target CCA threshold; and updating, by the first AP, the concurrent group information, where the updated concurrent group information includes an identifier of the first AP and an identifier of the concurrent STA associated with the first AP, and sending the updated concurrent group information to another AP in a system other than the first AP.

With reference to the second aspect of the present invention, in a first possible implementation manner of the second aspect of the present invention, the determining, by the first AP according to the identifier of the concurrent STA associated with each second AP, whether to join the concurrent group includes:

separately measuring, by the first AP according to the identifier of the concurrent STA associated with each second AP, a received signal strength from the concurrent STA associated with each second AP:

separately determining, by the first AP, whether the received signal strength from the concurrent STA associated with each second AP is less than a preset received signal strength threshold corresponding to the concurrent STA associated with each second AP; and if the received signal strength from the concurrent STA associated with each second AP is less than the received signal strength threshold corresponding to the concurrent STA associated with each second AP, determining, by the first AP, to join the concurrent group.

With reference to the second aspect of the present invention or the first possible implementation manner of the second aspect of the present invention, in a second possible implementation manner of the second aspect of the present invention, the determining, by the first AP from all STAs associated with the first AR according to the identifier of each second AP, a concurrent STA joining the concurrent group includes:

sending, by the first AP, a measurement indication message to all the STAs associated with the AP, where the measurement indication message includes the identifier of each second AP, and the measurement indication message is used to instruct all the STAs associated with the first AP to measure received signal strength from each second AP; and receiving, by the first AP, the received signal strengths that are from the second APs and that are returned by all the STAs associated with the AP, and selecting, from all the STAs associated with the first AP, one or more STAs having relatively low received signal strengths from the second APs as the concurrent STAs of the first AP.

With reference to the second aspect of the present invention or the first or the second possible implementation manner of the second aspect of the present invention, in a third possible implementation manner of the second aspect of the present invention, the concurrent group information includes a maximum concurrent service set quantity, and before the determining, by the first AP according to the identifier of the concurrent STA associated with each second AP, whether to join the concurrent group, the method further includes:

determining, by the first AP, whether a quantity of second APs that have already joined the concurrent group is less than the maximum concurrent service set quantity; and if the quantity of the second APs that have already joined the concurrent group is less than the maximum concurrent service set quantity, determining, by the first AP according to the identifier of the concurrent STA associated with each second AP, whether to join the concurrent group.

With reference to the third possible implementation manner of the second aspect of the present invention, in a fourth possible implementation manner of the second aspect of the present invention, if the quantity of the second APs that have already joined the concurrent group is equal to the maximum concurrent service set quantity, the first AP stops joining the concurrent group.

With reference to the second aspect of the present invention or the first or the second possible implementation manner of the second aspect of the present invention, in a fifth possible implementation manner of the second aspect of the present invention, before the determining, by the first AP according to the identifier of the concurrent STA associated with each second AP, whether to join the concurrent group, the method further includes:

determining, by the first AP, whether a current time reaches the concurrent time; and if the current time does not reach the concurrent time, determining, by the first AP according to the identifier of the concurrent STA associated with each second AP, whether to join the concurrent group.

With reference to the fifth possible implementation manner of the second aspect of the present invention, in a sixth possible implementation manner of the second aspect of the present invention, after the determining, by the first AP, whether a current time reaches the concurrent time, the method further includes:

if the current time reaches the concurrent time, stopping, by the first AP, joining the concurrent group.

With reference to any one of the second aspect of the present invention or the first to the sixth possible implementation manners of the second aspect of the present invention, in a seventh possible implementation manner of the second aspect of the present invention, the concurrent group information further includes an identifier of the concurrent group.

A third aspect of the present invention provides a method for adjusting a clear channel assessment CCA threshold, including:

receiving, by a station STA, a notification message sent by an access point AP, where the STA is a concurrent STA associated with the AP, the notification message is sent by the AP to the STA after the AP determines that the STA joins a concurrent group, and the notification message includes a concurrent time of the concurrent group and a target CCA threshold of the STA; and performing, by the STA, channel contention according to the notification message within the concurrent time by using the target CCA threshold.

With reference to the third aspect of the present invention, in a first possible implementation manner of the third aspect of the present invention, before the receiving, by a station STA, a notification message sent by an access point AP, the method further includes:

receiving, by the STA, a measurement indication message sent by the AP, where the measurement indication message includes an identifier of each second AP that has already joined the concurrent group, and the measurement indication message is used to instruct the STA to measure a received signal strength from each second AP:

measuring, by the STA, the received signal strength from each second AP according to the identifier of each second AP included in the measurement indication message; and sending, by the STA to the AP, the received signal strength that is from each second AP, so that the AP determines, according to the received signal strength from each second AP, whether the STA joins the concurrent group.

A fourth aspect of the present invention provides an access point AP, including:

a determining module, configured to determine, from all stations STAs associated with the AP, a concurrent STA joining a concurrent group;

a generation module, configured to generate concurrent group information of the concurrent group, where the concurrent group information includes an identifier of the AP, an identifier of the concurrent STA associated with the AP, and a concurrent time of the concurrent group; and a sending module, configured to send a notification message to the concurrent STA associated with the AP, where the notification message includes the concurrent time and a target CCA threshold of the concurrent STA associated with the AP and the notification message is used to instruct the concurrent STA associated with the AP to perform channel contention within the concurrent time by using the target CCA threshold: where the sending module is further configured to send the concurrent group information to another AP in a system other than the AP.

With reference to the fourth aspect of the present invention, in a first possible implementation manner of the fourth aspect of the present invention, the determining module is specifically configured to:

measure received signal strengths from all the STAs associated with the AP to the AP; and select one or more STAs with highest received signal strengths from all the STAs associated with the AP as the concurrent STA of the AP.

With reference to the fourth aspect of the present invention or the first possible implementation manner of the fourth aspect of the present invention, in a second possible implementation manner of the fourth aspect of the present invention, the concurrent group information further includes a maximum concurrent service set quantity, where the maximum concurrent service set quantity is used to instruct the another AP to stop joining the concurrent group when the another AP determines that a quantity of service sets that have already joined the concurrent group reaches the maximum concurrent service set quantity.

With reference to the fourth aspect of the present invention or the first or the second possible implementation manner of the fourth aspect of the present invention, in a third possible implementation manner of the fourth aspect of the present invention, the concurrent group information further includes an identifier of the concurrent group.

A fifth aspect of the present invention provides an access point AP, where the AP is a first AP, and the first AP includes:

a receiving module, configured to receive concurrent group information of a concurrent group, where the concurrent group information includes: an identifier of each second AP that has already joined the concurrent group, an identifier of a concurrent station STA associated with each second AP, and a concurrent time of the concurrent group;

a first determining module, configured to determine, according to the identifier, which is indicated by the concurrent group information, of the concurrent STA associated with each second AP, whether to join the concurrent group;

a second determining module, configured to: if the first determining module determines that the first AP determines to join the concurrent group, determine, from all STAs associated with the first AP, according to the identifier of each second AP, a concurrent STA joining the concurrent group;

a sending module, configured to send a notification message to the concurrent STA associated with the first AP, where the notification message includes the concurrent time and a target CCA threshold of the concurrent STA associated with the first AP, and the second notification message is used to instruct the concurrent STA associated with the first AP to perform channel contention within the concurrent time by using the target CCA threshold; and an update module, configured to update the concurrent group information, where the updated concurrent group information includes an identifier of the first AP and an identifier of the concurrent STA associated with the first AP, where the sending module is further configured to send the updated concurrent group information to another AP in a system other than the first AP.

With reference to the fifth aspect of the present invention, in a first possible implementation manner of the fifth aspect of the present invention, the first determining module is specifically configured to:

separately measure, according to the identifier of the concurrent STA associated with each second AP, a received signal strength from the concurrent STA associated with each second AP; and separately determine whether the received signal strength from the concurrent STA associated with each second AP is less than a preset received signal strength threshold corresponding to the concurrent STA associated with each second AP; and if the received signal strength from the concurrent STA associated with each second AP is less than the received signal strength threshold corresponding to the concurrent STA associated with each second AP, determine to join the concurrent group.

With reference to the fifth aspect of the present invention or the first possible implementation manner of the fifth aspect of the present invention, in a second possible implementation manner of the fifth aspect of the present invention, the second determining module is specifically configured to:

send a measurement indication message to all the STAs associated with the first AP, where the measurement indication message includes the identifier of each second AP, and the measurement indication message is used to instruct all the STAs associated with the first AP to measure received signal strength from each second AP; and receive the received signal strengths that are from the second APs and that are returned by all the STAs associated with the first AP, and select, from all the STAs associated with the first AP, one or more STAs having relatively low received signal strengths from the second APs as the concurrent STAs of the first AP.

With reference to the fifth aspect of the present invention or the first or the second possible implementation manner of the fifth aspect of the present invention, in a third possible implementation manner of the fifth aspect of the present invention, the concurrent group information includes a maximum concurrent service set quantity and correspondingly, the first determining module is further configured to:

determine whether a quantity of second APs that have already joined the concurrent group is less than the maximum concurrent service set quantity; and if the quantity of the second APs that have already joined the concurrent group is less than the maximum concurrent service set quantity, determine, according to the identifier of the concurrent STA associated with each second AP, whether the first AP joins the concurrent group.

With reference to the third possible implementation manner of the fifth aspect of the present invention, in a fourth possible implementation manner of the fifth aspect of the present invention, if the quantity of the second APs that have already joined the concurrent group is equal to the maximum concurrent service set quantity, the first determining module determines that the first AP stops joining the concurrent group.

With reference to the fifth aspect of the present invention or the first or the second possible implementation manner of the fifth aspect of the present invention, in a fifth possible implementation manner of the fifth aspect of the present invention, the first determining module is further configured to:

determine whether a current time reaches the concurrent time; and if the current time does not reach the concurrent time, determine, according to the identifier of the concurrent STA associated with each second AP, whether the first AP joins the concurrent group.

With reference to the fifth possible implementation manner of the fifth aspect of the present invention, in a sixth possible implementation manner of the fifth aspect of the present invention, if the current time reaches the concurrent time, the first determining module determines that the first AP stops joining the concurrent group.

With reference to any one of the fifth aspect of the present invention or the first to the sixth possible implementation manners of the fifth aspect of the present invention, in a seventh possible implementation manner of the fifth aspect of the present invention, the concurrent group information further includes an identifier of the concurrent group.

A sixth aspect of the present invention provides a station STA, including:

a receiving module, configured to receive a notification message sent by an access point AP, where the STA is a concurrent STA associated with the AP, the notification message is sent by the AP to the STA after the AP determines that the STA joins a concurrent group, and the notification message includes a concurrent time of the concurrent group and a target CCA threshold of the STA; and a contention module, configured to perform channel contention according to the notification message within the concurrent time by using the target CCA threshold.

With reference to the sixth aspect of the present invention, in a first possible implementation manner of the sixth aspect of the present invention, the receiving module is further configured to: receive a measurement indication message sent by the AP, where the measurement indication message includes an identifier of each second AP that has already joined the concurrent group, and the measurement indication message is used to instruct the STA to measure a received signal strength from each second AP; and correspondingly, the STA further includes:

a measurement module, configured to measure the received signal strength from each second AP according to the identifier of each second AP included in the measurement indication message; and a sending module, configured to send, to the AP, the received signal strength that is from each second AP, so that the AP determines, according to the received signal strength from each second AP, whether the STA joins the concurrent group.

A seventh aspect of the present invention provides an access point AP communications apparatus, including: a processor, a memory, a communications interface, and a system bus, where the memory and the communications interface are connected to and communicate with the processor by using the system bus:

the communications interface is configured to communicate with another device:

the memory stores a computer executable instruction; and the processor is configured to run the computer executable instruction, so that the communications apparatus performs the method provided in any one of the first aspect of the present invention or the first to the third possible implementation manners of the first aspect of the present invention.

An eighth aspect of the present invention provides an access point AP communications apparatus, where the AP is a first AP, and the first AP includes: a processor, a memory, a communications interface, and a system bus, where the memory and the communications interface are connected to and communicate with the processor by using the system bus:

the communications interface is configured to communicate with another device;

the memory stores a computer executable instruction; and the processor is configured to run the computer executable instruction, so that the communications apparatus performs the method provided in any one of the second aspect of the present invention or the first to the seventh possible implementation manners of the second aspect of the present invention.

A ninth aspect of the present invention provides a communications apparatus, including: a processor, a memory, and a communications interface, where the memory and the communications interface are connected to and communicate with the processor:

the communications interface is configured to communicate with another device:

the memory stores a computer executable instruction; and the processor is configured to run the computer executable instruction, so that the communications apparatus performs the method in the first aspect of the present invention or the first possible implementation manner of the first aspect of the present invention.

According to the method for adjusting a clear channel assessment threshold and the device that are provided in the embodiments of the present invention, an AP determines, from all stations STAs associated with the AP, a concurrent STA joining a concurrent group, and then generates concurrent group information of the concurrent group, where the concurrent group information includes an identifier of the AP, an identifier of the concurrent STA associated with the AP, and a concurrent time of the concurrent group; and the AP sends the concurrent group information to another AP in a system other than the AP, so that a BSS to which the another AP belongs determines, according to the concurrent group information, to join the concurrent group, to eventually form the concurrent group. All concurrent STAs joining the concurrent group perform channel contention within the concurrent time by using an increased target CCA threshold, to increase a possibility that the concurrent STAs send data, so that a system throughput can be improved. All STAs out of the concurrent group that are associated with the AP and a non-concurrent STA, which is associated with the AP, in the concurrent group do not increase a CCA threshold, and perform channel contention by using a relatively low normal CCA threshold. In this way, a quantity of concurrent links can be controlled by controlling a quantity of BSSs in the concurrent group. Therefore, interference between the concurrent links can be reduced, and the system throughput is further improved.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 4 is a schematic structural diagram of concurrent group information:

FIG. 5 is a schematic structural diagram of a measurement indication message:

FIG. 6 is a schematic structural diagram of Embodiment 3 of a method for adjusting a CCA threshold according to the present invention:

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figures 1, 2:
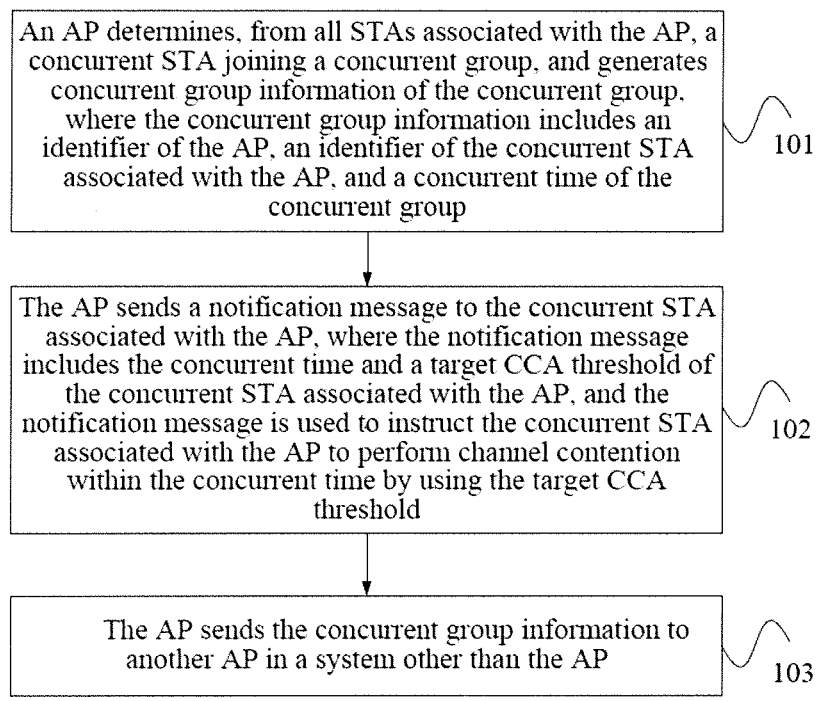
FIG. 1 is a flowchart of a method for adjusting a CCA threshold according to Embodiment 1 of the present invention.
FIG. 2 is a schematic structural diagram of a notification message.

FIG. 1 is a flowchart of a method for adjusting a CCA threshold according to Embodiment 1 of the present invention. The method provided in this embodiment may be performed by an AP. A person skilled in the art may understand that the AP may be a device that is on a network side and that can provide receiving and sending services of a wireless signal for a wireless terminal. A wireless signal provided by each AP may cover a particular location range. When multiple APs are deployed, coverage areas in a cellular shape form an entire radio network system. Each AP may be associated with multiple STAs. A STA is a client in a WLAN, and may be a computer into which a wireless network interface card is installed, or may be a smartphone having a WiFi module. The STA may be movable, or may be fixed. The STA is a most essential composition unit of the wireless local area network. A STA that is associated with an AP and that is mentioned in this embodiment of the present invention is a STA within coverage of a wireless signal of the AP. The AP and multiple STAs associated with the AP form a basic service set (Basic Service Set, BSS for short), and multiple BSSs form a radio network system.

In the prior art, a packet error rate (packet error rate, PER for short) value is corrected, and a current CCA threshold is adjusted according to the corrected PER value, so that the CCA threshold is dynamically adjusted by using a real and effective collision PER value to adapt to different environment changes, and a network throughput rate and service quality are improved. The CCA threshold is increased, which can improve a system throughput to a certain extent.

However, for a radio network system in which dense deployment is performed, a large quantity of APs communicate with a large quantity of STAs, and relatively obvious interference is generated. In short, in a conventional method for increasing a CCA threshold, a possibility of link transmission is increased, thereby increasing a possibility of improving a throughput. However, a large quantity of concurrent links are generated, and relatively strong interference is formed between the large quantity of concurrent links. This, instead, affects improvement of the system throughput. To more effectively improve the system throughput, in a solution of this embodiment of the present invention, a concurrent group is created, and each AP selects a STA from all STAs associated with the AP to join the concurrent group. All concurrent STAs in the concurrent group that are associated with the AP perform channel contention within a concurrent time by using an increased target CCA threshold, and all STAs out of the concurrent group that are associated with the AP and a non-concurrent STA, which is associated with the AP, in the concurrent group do not increase a CCA threshold, and perform channel contention by using a relatively low normal CCA threshold. In this way, a quantity of concurrent links can be controlled by controlling a quantity of BSSs in the concurrent group. Therefore, interference caused by the concurrent links can be reduced, and the system throughput is effectively improved.

In addition, a concurrent group mentioned in each embodiment of the present invention refers to a set of communications devices that may communicate with each other at a same time by using a same communication resource. Concurrent communication refers to that all concurrent STAs in a concurrent group may communicate with each other at a same time by using a same communication resource. The communication resource specifically refers to a channel. For example, a channel at a specific communication frequency is used. The concurrent communication may be communication between STAs or communication between a STA and an AP. When STAs communicate with each other, an AP also needs to be used. When concurrent STAs in a concurrent group perform concurrent communication within a concurrent time, mutual interference between the concurrent STAs is very small.

In an embodiment, an AP serves as a creator of a concurrent group. As shown in FIG. 1, the method of this embodiment may include the following steps.

Step 101: The AP determines, from all STAs associated with the AP, a concurrent STA joining the concurrent group, and generates concurrent group information of the concurrent group, where the concurrent group information includes an identifier of the AP, an identifier of the concurrent STA associated with the AP, and a concurrent time of the concurrent group.

As the creator of the concurrent group, the AP first selects, from all the STAs associated with the AP, the concurrent STA joining the concurrent group. The AP may select one or more STAs to join the concurrent group, and a quantity of the concurrent STAs selected by the AP may be pre-agreed. The AP may select the concurrent STA randomly or select according to a priority order of the STAs, for example, preferentially select a STA having a high priority as the concurrent STA. Alternatively, the AP measures received signal strengths from all the STAs associated with the AP to the AP, and then selects one or more STAs having highest or higher received signal strengths from all the STAs associated with the AP as the concurrent STAs of the AP.

After determining the concurrent STA, the AP adds the concurrent STA to the concurrent group, and generates the concurrent group information of the concurrent group, where the concurrent group information includes the identifier of the AP, the identifier of the concurrent STA associated with the AP, and the concurrent time. The concurrent group information may further include an identifier of the concurrent group. When there are multiple concurrent groups in a system, the concurrent groups are distinguished from each other by using identifiers of the concurrent groups, concurrent times of the concurrent groups are different, and the concurrent times of the concurrent groups cannot overlap each other. One AP or STA may join multiple concurrent groups. Concurrent STAs associated with an AP joining a concurrent group may perform concurrent communication within a concurrent time.

Step 102: The AP sends a notification message to the concurrent STA associated with the AP, where the notification message includes the concurrent time and a target CCA threshold of the concurrent STA associated with the AP, and the notification message is used to instruct the concurrent STA associated with the AP to perform channel contention within the concurrent time by using the target CCA threshold.

FIG. 2 is a schematic structural diagram of a notification message. As shown in FIG. 2, the notification message includes: a first field, which is an identifier of a concurrent group; a second field, which is an identifier of a concurrent STA associated with an AP; a third field, which is a concurrent time; and a fourth field, which is a target CCA threshold of the concurrent STA. An order of these fields may differ in specific examples. In addition, some fields thereof may be reused in a particular form.

When the AP is associated with multiple concurrent STAs, target CCA thresholds of the multiple concurrent STAs may be the same or may be different. The AP may set different target CCA thresholds according to a situation of each concurrent STA. The target CCA may be calculated by the AP according to a historical system throughput by using an existing algorithm. In an implementation manner the target CCA threshold is a static value, that is, all concurrent STAs use the target CCA threshold within the concurrent time. In another implementation manner, an AP in each BSS may dynamically adjust the target CCA threshold. For example, all concurrent STAs adjust, at a start moment of the concurrent time, a CCA threshold to the target CCA threshold carried in the concurrent group message, and the target CCA threshold carried in the concurrent group message is used as an initial target CCA threshold. After a period of time, the initial target CCA threshold is uniformly increased by a particular numerical value. Then, each AP calculates a throughput of a BSS to which the AP belongs. If a throughput of an entire system increases after the initial target CCA threshold is increased, the initial target CCA threshold is increased to the adjusted target CCA threshold. Similarly increasing a value of the target CCA threshold continues, until the system throughput cannot be increased any longer.

In the embodiments of the present invention, at the start moment of the concurrent time, the concurrent STA increases the CCA threshold to the target CCA threshold; within the concurrent time, the concurrent STA performs channel contention by using the target CCA threshold. At the start moment of the concurrent time, another STA in the system other than the concurrent STA does not increase the CCA threshold. After the concurrent time is over, all concurrent STAs recover the CCA thresholds to normal values. Within the concurrent time, assuming that the multiple concurrent STAs associated with the AP all need to send data, the concurrent STAs first need to perform carrier sense before sending data. If it is detected that energy of a current channel exceeds the target CCA threshold, it indicates that the current channel is busy, and the STAs do not send data. If it is detected that the energy of the current channel is less than the target CCA threshold, it indicates that the current channel is clear, and the concurrent STAs perform channel contention. In other words, a STA in a BSS uses a CSMA/CA contention mechanism when performing channel contention, and eventually, only one concurrent STA of the multiple concurrent STAs associated with the AP can obtain a channel through contention. Within the concurrent time, another non-concurrent STA performs CSMA/CA contention by using a relatively low normal CCA threshold, and a possibility that the non-concurrent STA obtains a channel through contention is less than a possibility of the foregoing concurrent STA. STAs that are in multiple BSSs and that join the concurrent group may all perform channel contention within the concurrent time, and a concurrent STA obtaining a channel through contention may perform concurrent communication within the concurrent time.

In the CSMA/CA mechanism, after a STA senses that a channel is clear, the STA waits for a random time, and then broadcasts and sends a request to send (Request to send. RTS for short) frame, where the RTS frame includes a network allocation vector (Network Allocation Vector. NAV for short) field and a receiving address. When an AP in a network system receives the RTS frame, if the receiving address in the RTS is different from a Media Access Control (Media Access Control, MAC for short) address of the AP, the AP does not respond, and only sets that the AP does not send data in a NAV time period. If an AP receives the RTS frame, and the receiving address in the RTS frame is the same as the MAC address of the AP, the AP broadcasts and sends a clear to send (Clear to send, CTS for short) frame after a short interframe space (Short interframe Space, SIFS for short) of the RTS expires. A receiving address of the CTS flame is a sending address of the RTS frame, the CTS frame also carries a NAV, and the NAV carried in the CTS frame is equal to a NAV carried in the RTS frame minus a transmission time of the CTS frame minus a transmission time of CTS and a SIFS time. If a STA receiving the CTS frame finds that the receiving address is different from an address of the STA, the STA does not send data in a NAV time period carried in the CTS frame. If the address of the STA is the same as the address of the STA, the STA obtains a channel through contention, and may send data in the NAV time period carried in the CTS frame. It is assumed that an AP 1 is associated with two concurrent STAs: a STA 1 and a STA 2. If the STA 1 and the STA 2 both need to send data in a concurrent time, the STA 1 first sends an RTS frame to the AP 1, the AP 1 broadcasts a CTA frame after receiving the RTS frame, and both the STAs associated with the AP 1 can receive the CTS. After receiving the CTS frame, the STA 2 does not send data, and only the STA 1 sends data within the concurrent time.

Step 103: The AP sends the concurrent group information to another AP in a system other than the AP.

Specifically, the AP may send the concurrent group information to the another AP by using a backhaul line (backhaul) between the AP and the another AP, so that a service set to which the another AP belongs chooses to join the concurrent group indicated by the concurrent group information. All the concurrent STAs in the concurrent group increase CCA thresholds of the concurrent STAs to the target CCA threshold within the concurrent time, and perform channel contention by using the target CCA threshold. After receiving the concurrent group information, the another AP determines, according to the concurrent group information, whether to join the concurrent group. Eventually, multiple service sets join the concurrent group. The concurrent STAs that are associated with the AP and that join the concurrent group separately perform channel contention within the concurrent time. One concurrent STA separately successfully obtains a channel between the current STA and the AP associated with the STA, and then may communicate, by using the channel, with the AP associated with the STA, or may communicate with another STA by using the AP associated with the STA. Each concurrent STA obtaining the channel through contention may perform concurrent communication within the concurrent time by using the channel, that is, all the concurrent STAs obtaining the channel through contention may perform communication within a same time by using the channel. When the concurrent STAs in the concurrent group perform concurrent communication within the concurrent time, mutual interference between the concurrent STAs is very small. All the concurrent STAs in the concurrent group perform channel contention within the concurrent time by using the increased target CCA threshold, and a STA out of the concurrent group performs channel contention by using a normal CCA threshold. The normal CCA threshold herein refers to a CCA threshold before increasing. In addition, all the concurrent STAs joining the concurrent group further reduce the CCA threshold from the target CCA threshold to the normal CCA threshold outside the concurrent time.

In the method of this embodiment, an AP determines, from all STAs associated with the AP, a concurrent STA joining a concurrent group, adds the concurrent STA of the AP to the concurrent group, generates concurrent group information of the concurrent group, and sends the concurrent group information to another AP in a system, so that a service set to which the another AP belongs chooses, according to the concurrent group information, to join the concurrent group, to eventually form the concurrent group. All concurrent STAs in the concurrent group that are associated with the AP perform channel contention within a concurrent time by using an increased target CCA threshold, to increase a possibility that the concurrent STAs send data, so that a system throughput can be improved. All STAs out of the concurrent group that are associated with the AP and a non-concurrent STA, which is associated with the AP, in the concurrent group do not increase a CCA threshold and perform channel contention by using a relatively low normal CCA threshold. In this way, a quantity of concurrent links can be controlled by controlling a quantity of BSSs in the concurrent group, and the quantity of concurrent links in the system is limited. Therefore, interference between the concurrent links can be reduced, and the system throughput is further improved.

Optionally, in Embodiment 1, the concurrent group information may further include a maximum concurrent service set quantity, where the maximum concurrent service set quantity is used to instruct the another AP not to join the concurrent group when the another AP determines that a quantity of service sets that have already joined the concurrent group reaches the maximum concurrent service set quantity. When receiving concurrent group information sent by another AP, an AP first determines whether a quantity of service sets that have already joined the concurrent group is less than the maximum concurrent service set quantity. Specifically, the concurrent group information received by the AP includes an identifier of an AP that has already joined the concurrent group. The AP obtains, according to the identifiers of the APs that have already joined the concurrent group, a quantity of the APs that have already joined the concurrent group, and the quantity of the APs that have already joined the concurrent group is equal to the quantity of the service sets joining the concurrent group. Therefore, the AP may compare the quantity of the APs that have already joined the concurrent group with the maximum concurrent service set quantity included in the concurrent group information. If the quantity of the service sets that have already joined the concurrent group is less than the maximum concurrent service set quantity, the AP further determines, further according to the identifier, which is in the concurrent group information, of each AP that has already joined the concurrent group and an identifier of a concurrent STA associated with each AP that has already joined the concurrent group, whether to join the concurrent group. If the quantity of the service sets that have already joined the concurrent group is equal to the maximum concurrent service set quantity, it indicates that the concurrent group is full, and the AP stops attempting to join the concurrent group, that is, the AP does not continue to perform a subsequent operation: further determining, according to the identifier, which is in the concurrent group information, of each AP that has already joined the concurrent group and the identifier of the concurrent STA associated with each AP that has already joined the concurrent group, whether to join the concurrent group.

Certainly, the concurrent group information may not carry the maximum concurrent service set quantity. When receiving concurrent group information sent by another AP, an AP determines whether a current time reaches a concurrent time. If the current time does not reach the concurrent time, it indicates that the AP has an opportunity to join the concurrent group, and the AP further determines, according to the identifier of each AP that has already joined the concurrent group and the identifier of the concurrent STA associated with each AP that has already joined the concurrent group, whether to join the concurrent group. If the current time already reaches the concurrent time, the AP stops attempting to join the concurrent group, that is, the AP does not continue to perform a subsequent operation: further determining, according to the identifier, which is in the concurrent group information, of each AP that has already joined the concurrent group and the identifier of the concurrent STA associated with each AP that has already joined the concurrent group, whether to join the concurrent group.

Figure 3:
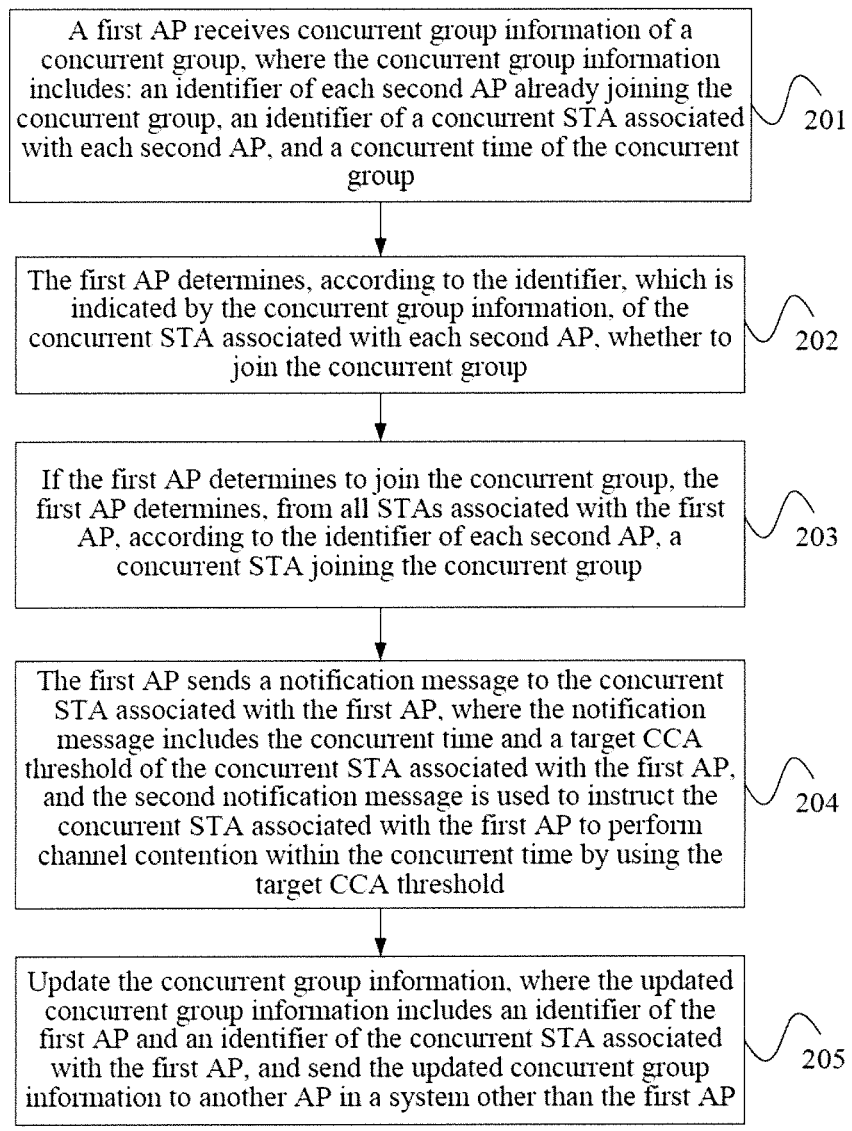
FIG. 3 is a flowchart of a method for adjusting a CCA threshold according to Embodiment 2 of the present invention.

The solution of this embodiment of the present invention is described in Embodiment 1 from the perspective of a creator of a concurrent group. A solution of an embodiment of the present invention is specifically described in Embodiment 2 of the present invention from the perspective of a joiner of a concurrent group. FIG. 3 is a flowchart of a method for adjusting a CCA threshold according to Embodiment 2 of the present invention. As shown in FIG. 3, the method of this embodiment may include the following steps.

Step 201: A first AP receives concurrent group information of a concurrent group, where the concurrent group information includes: an identifier of each second AP that has already joined the concurrent group, an identifier of a concurrent STA associated with each second AP, and a concurrent time of the concurrent group.

FIG. 4 is a schematic structural diagram of concurrent group information. As shown in FIG. 4, the concurrent group information includes: a first field, which is an identifier of a concurrent group; a second field, which is an identifier of a second AP; and a third field, which is an identifier, which is included in the second field, of a concurrent STA associated with the second AP. The fields in FIG. 4 have a particular order, and the order of the fields represents an order of an AP and a STA that join the concurrent group. By analogy, when more APs and STAs associated with the APs join the concurrent group, the joining APs and concurrent STAs associated with the APs are sequentially written to corresponding fields in order. The last field of the concurrent group information is the concurrent time of the concurrent group.

Step 202: The first AP determines, according to the identifier, which is indicated by the concurrent group information, of the concurrent STA associated with each second AP, whether to join the concurrent group.

Specifically, the first AP may determine, in the following manner, whether to join the concurrent group.

First, the first AP separately measures, according to the identifier of the concurrent STA associated with each second AP, a received signal strength from the concurrent STA associated with each second AP.

The received signal strength from the concurrent STA associated with each second AP specifically refers to a received signal strength of data that is sent by a concurrent STA associated with a second AP and that is received by each first AP. When there are multiple second APs, and each AP is associated with multiple concurrent STAs, the first AP needs to measure received signal strengths from concurrent STAs associated with all second APs. When the first AP measures the received signal strength from the concurrent STA associated with each second AP, specifically, when the concurrent STA associated with the second AP sends data to the second AP, the first AP can also obtain, by listening, the data sent by the concurrent STA associated with the second AP, and the first AP uses, as the received signal strength, a power of a received signal of the data sent by the concurrent STA associated with the second AP.

Then, the first AP separately determines whether the received signal strength from the concurrent STA associated with each second AP is less than a preset received signal strength threshold corresponding to the concurrent STA associated with each second AP.

The first AP determines, according to the received signal strengths from all the concurrent STAs that have already joined the concurrent group to the first AP, whether to join the concurrent group. When the received signal strengths from all the concurrent STAs that have already joined the concurrent group to the first AP are all less than the received signal strength threshold, it indicates that interference of all the concurrent STAs that have already joined the concurrent group to the first AP is very small. After joining the concurrent group, the first AP may normally receive and send data, and is not interfered by the concurrent STA that has already joined the concurrent group. When a received signal strength from one concurrent STA of the concurrent STAs associated with the second APs to the first AP does not meet the foregoing condition, it indicates that interference of the concurrent STA that does not meet the condition to the first AP is relatively great. If the first AP joins the concurrent group, the concurrent STA that does not meet the condition interferes with normal data receiving and sending of the first AP. Therefore, the first AP does not join the concurrent group.

In this embodiment, the received signal strength threshold corresponding to the concurrent STA associated with each second AP may be set in the following three manners. A first manner is: received signal strength thresholds corresponding to the concurrent STAs associated with all the second APs are the same, that is, a uniform received signal strength threshold is set. A second manner is: a received signal strength threshold may be set for each second AP, and received signal strength thresholds corresponding to different second APs may be different, but all received signal strength thresholds of the multiple concurrent STAs associated with each second AP are the same. A third manner is: received signal strength thresholds corresponding to the concurrent STAs associated with all the second APs are separately set, and the received signal strengths corresponding to the multiple concurrent STAs associated with each second AP may also be different.

The foregoing only gives a method for determining, by the first AP, whether to join the concurrent group. Certainly the first AP may further use another manner. For example, the first AP obtains, according to the identifier of the concurrent STA associated with each second AR a distance from the first AP to the concurrent STA associated with each second AP, and determines, according to the distance from the first AP to the concurrent STA associated with each second AP, whether to join the concurrent group.

Step 203: If the first AP determines to join the concurrent group, the first AP determines, from all STAs associated with the first AP, according to the identifier of each second AP, a concurrent STA joining the concurrent group.

Specifically, the following manners may be used.

First, the first AP sends a measurement indication message to all the STAs associated with the first AP, where the measurement indication message includes the identifier of each second AP, and the measurement indication message is used to instruct all the STAs associated with the first AP to measure the received signal strength from each second AP.

For example, FIG. 5 is a schematic structural diagram of a measurement indication message. As shown in FIG. 5, a first field of the measurement indication message is an identifier of a concurrent group, a second field is an identifier of an AP 1, a third field is an identifier of an AP 2, and both the AP 1 and the AP 2 are second APs. The measurement indication message may be carried in a beacon frame (beacon) or a probe response frame (probe response).

After receiving the measurement indication message, all the STAs associated with the first AP separately measure received signal strengths from the AP 1 and the AP 2 respectively according to the identifiers of the AP 1 and the AP 2, that is, each STA associated with the first AP needs to measure two received signal strengths.

Then, the first AP receives the received signal strengths that are from the second APs and that are returned by all the STAs associated with the first AP, and the received signal strength herein may be specifically receive power of a received signal from each second AP. One or more STAs having relatively small received signal strengths from each second AP are selected from all the STAs associated with the first AP as the concurrent STAs of the first AP.

In one manner, each STA associated with the first AP needs to send a received signal strength measured by each STA to the first AP, and the first AP performs selection according to measurement results of all the STAs. Specifically, the first AP separately compares the received signal strengths, which are obtained by the STAs through measurement, from the second APs with a preset threshold, and selects, as the concurrent STA, a STA whose received signal strength that is from each second AP is less than the preset threshold. Alternatively, when there are multiple STAs whose received signal strengths that are from the second APs are less than the preset threshold, the first AP uses, as candidate STAs, the multiple STAs whose received signal strengths that are from the second APs are less than the preset threshold. Then, the first AP selects, from the candidate STAs, one or more STAs all having lowest received signal strengths from the second APs as the concurrent STAs.

In another manner, after completing measurement, each STA associated with the first AP separately compares the received signal strength, which is obtained through measurement, from each second AP with the preset threshold. When the received signal strength from each second AP is less than the preset threshold, the STA reports a measurement result to the first AP. When one received signal strength of the received signal strengths from the second APs is not less than the preset threshold, the STA does not report the measurement result to the first AP. The first AP may use, as the concurrent STAs, all reported STAs meeting that received signal strengths from the second APs are all less than the preset threshold. Alternatively, when there are multiple reported STAs, the first AP may use all the reported STAs as the candidate STAs. Then, the first AP selects, from the candidate STAs, one or more STAs all having lowest received signal strengths from the second APs as the concurrent STAs.

In the foregoing two manners, when none of the STAs meet the condition, that is, the received signal strength from each second AP is less than the preset threshold, the first AP fails to join the concurrent group.

In the foregoing manners, the first AP selects a STA having a small received signal strength as the concurrent STA according to the received signal strength from each second AP to the STA, and a smaller received signal strength from the second AP to the STA indicates smaller interference of the second AP to the STA. For example, when each AP determines a concurrent STA, selecting a STA having a lowest received signal strength may reduce interference between concurrent STAs. Interference between concurrent STAs in a concurrent group is very small when the concurrent STAs send data at the same time. Therefore, a throughput of an entire system can be improved. In the prior art, to improve the throughput, CCA thresholds of all STAs in the system are increased, resulting in a large number of concurrent links in the system, and great interference between the concurrent links. In the solution of this embodiment, only concurrent STAs in a concurrent group increase CCA thresholds in a concurrent time. Therefore, a quantity of concurrent links in a system is limited, and interference between the concurrent links is reduced, so that a system throughput can be improved.

Certainly, the second AP may further determine the concurrent STA in another manner, for example, performs selection randomly or performs selection according to a priority order of STAs. Descriptions are provided only by using examples in this embodiment of the present invention, and a selection manner of the first AP is not limited.

Step 204: The first AP sends a notification message to the concurrent STA associated with the first AP, where the notification message includes the concurrent time and a target CCA threshold of the concurrent STA associated with the first AP, and the second notification message is used to instruct the concurrent STA associated with the first AP to perform channel contention within the concurrent time by using the target CCA threshold.

When the first AP is associated with multiple concurrent STAs, target CCA thresholds of the concurrent STAs may be the same or may be different.

Step 205: Update the concurrent group information, where the updated concurrent group information includes an identifier of the first AP and an identifier of the concurrent STA associated with the first AP, and send the updated concurrent group information to another AP in a system other than the first AP.

The first AP sends the updated concurrent group information to the another AP in the system, so that the another AP chooses, according to the updated concurrent group information, to join the concurrent group. All the concurrent STAs in the concurrent group increase CCA thresholds of all the concurrent STAs to the target CCA threshold at a start moment of the concurrent time, and the concurrent STAs perform channel contention within the concurrent time by using the target CCA threshold. A possibility that a STA performing channel contention by using the target CCA threshold obtains a channel through contention is generally greater than a possibility of a STA performing channel contention by using a relatively low normal CCA threshold. A concurrent STA obtaining the channel through contention may perform concurrent communication within the concurrent time by using the channel obtained through contention. The concurrent communication may be communication between STAs or communication between a STA and an AP. When concurrent STAs in a concurrent group perform concurrent communication within a concurrent time, mutual interference between the concurrent STAs is very small.

In the method of this embodiment, a first AP determines, according to received concurrent group information, whether to join a concurrent group; if the first AP determines to join the concurrent group, the first AP further determines, from all STAs associated with the first AP, a concurrent STA joining the concurrent group, updates the concurrent group information, and sends the updated concurrent group information to another AP in a system, to eventually form the concurrent group. All concurrent STAs in the concurrent group that are associated with the AP perform channel contention within a concurrent time by using an increased target CCA threshold, to increase a possibility that the concurrent STAs send data, so that a system throughput can be improved. All STAs out of the concurrent group that are associated with the AP and a non-concurrent STA, which is associated with the AP, in the concurrent group do not increase a CCA threshold, and perform channel contention by using a relatively low normal CCA threshold. In this way, a quantity of concurrent links can be controlled by controlling a quantity of BSSs in the concurrent group, and a quantity of the concurrent links in the system is limited. Therefore, interference between the concurrent links can be reduced, and the system throughput is further improved.

Based on Embodiment 2, optionally, before step 202, the method further includes the following steps: determining, by the first AP, whether a quantity of second APs that have already joined the concurrent group is less than a maximum concurrent service set quantity, where the maximum concurrent service set quantity is carried in the concurrent group information; and if the quantity of the second APs that have already joined the concurrent group is less than the maximum concurrent service set quantity, performing, by the first AP, step 202: or if the quantity of the second APs that have already joined the concurrent group is equal to the maximum concurrent service set quantity, stopping, by the first AP, attempting to join the concurrent group, that is, not performing, by the first AP, step 202 and the steps after step 202 any longer.

Alternatively, before step 202, the method includes following steps: determining, by the first AP, whether a current time reaches the concurrent time; and if the current time does not reach the concurrent time, performing, by the first AP, step 202: or if the current time reaches the concurrent time, stopping, by the first AP, attempting to join the concurrent group, that is, not performing, by the first AP, step 202 and the steps after step 202 any longer.

FIG. 6 is a schematic structural diagram of Embodiment 3 of a method for adjusting a CCA threshold according to the present invention. This embodiment specifically describes, from the perspective of a STA, the method for adjusting a CCA threshold. As shown in FIG. 6, the method of this embodiment includes the following steps.

Step 301: A STA receives a notification message sent by an AP, where the STA is a concurrent STA associated with the AP, the notification message is sent by the AP to the STA after the AP determines that the STA joins a concurrent group, and the notification message includes a concurrent time of the concurrent group and a target CCA threshold of the STA.

Step 302: The STA performs channel contention according to the notification message within the concurrent time by using the target CCA threshold.

In the method of this embodiment, at a start moment of a concurrent time, a STA increases a CCA threshold of the STA to a target CCA threshold according to a notification message sent by an AP: within the concurrent time, all concurrent STAs in the concurrent group perform channel contention by using the target CCA threshold. A concurrent STA that is associated with another AP and that joins the concurrent group also performs channel contention within the concurrent time by using a target CCA threshold of the concurrent STA. A possibility that a STA performing channel contention by using a target CCA threshold obtains a channel through contention is generally greater than a possibility of a STA performing channel contention by using a relatively low normal CCA threshold. A concurrent STA obtaining the channel through contention may perform concurrent communication within the concurrent time by using the channel obtained through contention. The concurrent communication may be communication between STAs or communication between a STA and an AP. When concurrent STAs in a concurrent group perform concurrent communication within a concurrent time, mutual interference between the concurrent STAs is very small.

Based on Embodiment 3, when the AP is not a creator of the concurrent group, for the concurrent STA associated with the AP, before step 301, the method further includes: receiving, by the STA, a measurement indication message sent by the AP, where the measurement indication message is used to instruct the STA to measure a received signal strength from each second AP. After the STA completes measurement, in one manner, the STA sends, to the AP, the received signal strength that is from each second AP, and the AP determines, according to the received signal strength from each second AP, whether the STA joins the concurrent group. In another manner, the STA determines whether to join the concurrent group, and if the STA determines to join the concurrent group, the STA reports, to the AP, the received signal strength that is from each second AP. For a specific manner of determining, by the AP or the STA according to the received signal strength from each second AP, whether the STA joins the concurrent group, refer to related descriptions of step 203 in Embodiment 2, and details are not described herein again.

Figure 7:
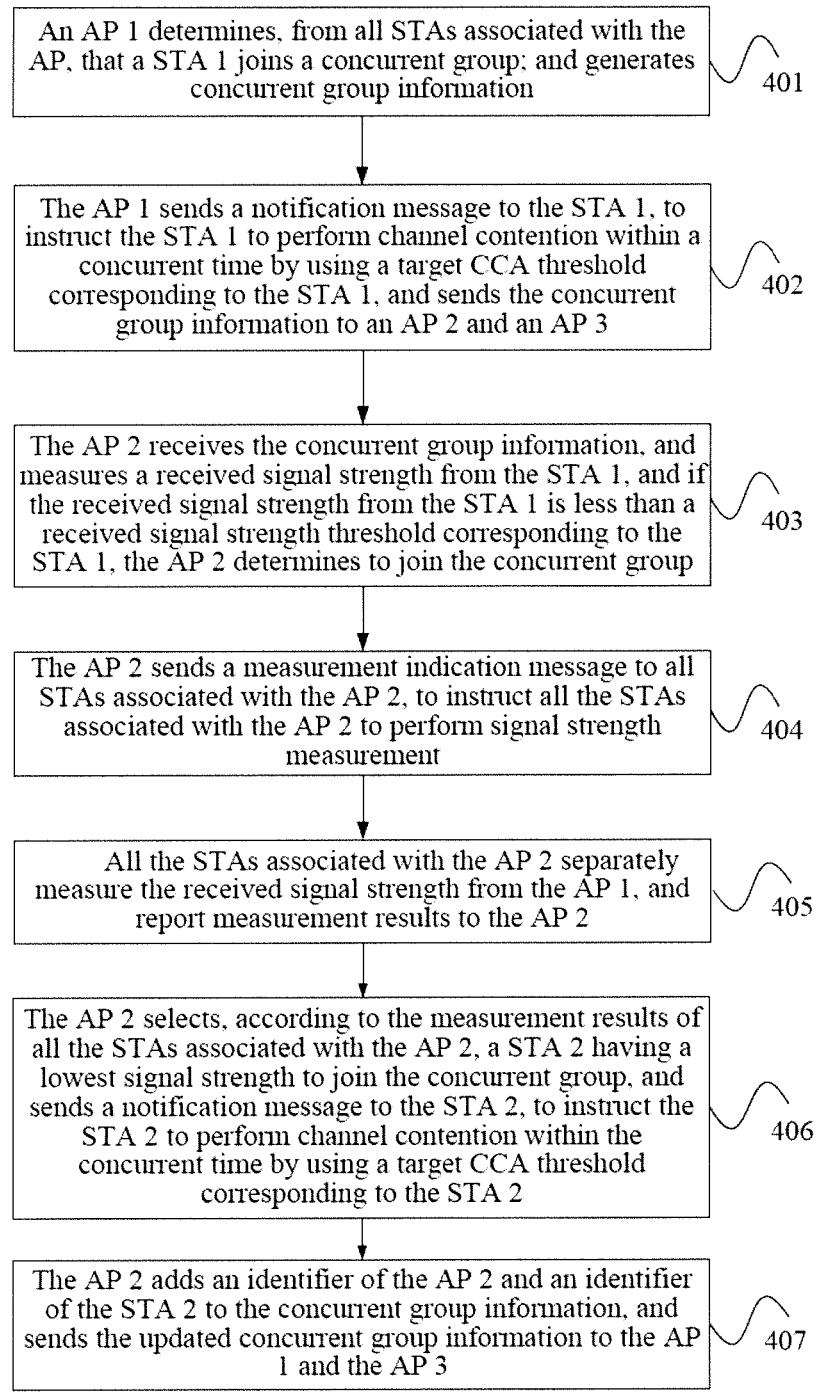
FIG. 7 is a schematic flowchart of a process of forming a concurrent group according to Embodiment 4 of the present invention.
Figure 8:
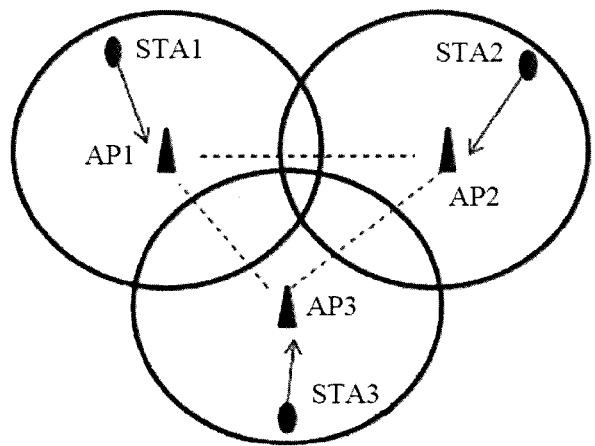
FIG. 8 is a schematic structural diagram of a system used in Embodiment 4 of the present invention.

FIG. 7 is a schematic flowchart of a process of forming a concurrent group according to Embodiment 4 of the present invention. FIG. 8 is a schematic structural diagram of a system used in Embodiment 4 of the present invention. As shown in FIG. 8, the system includes three BSSs, and an AP in each BSS selects one concurrent STA to join a concurrent group. As shown in FIG. 7, the method of this embodiment includes the following steps.

Step 401: An AP 1 determines, from all STAs associated with the AP, that a STA 1 joins a concurrent group; and generates concurrent group information.

The concurrent group information includes an identifier of the AP 1, an identifier of the STA 1, and a concurrent time.

Step 402: The AP 1 sends a notification message to the STA 1, to instruct the STA 1 to perform channel contention within a concurrent time by using a target CCA threshold corresponding to the STA 1, and sends the concurrent group information to an AP 2 and an AP 3.

Step 403: The AP 2 receives the concurrent group information, and measures a received signal strength from the STA 1, and if the received signal strength from the STA 1 is less than a received signal strength threshold corresponding to the STA 1, the AP 2 determines to join the concurrent group.

Step 404: The AP 2 sends a measurement indication message to all STAs associated with the AP 2, to instruct all the STAs associated with the AP 2 to perform signal strength measurement.

The measurement indication message includes the identifier of the AP 1.

Step 405: All the STAs associated with the AP 2 separately measure the received signal strength from the AP 1, and report measurement results to the AP 2.

Step 406: The AP 2 selects, according to the measurement results of all the STAs associated with the AP 2, a STA 2 having a lowest signal strength to join the concurrent group, and sends a notification message to the STA 2, to instruct the STA 2 to perform channel contention within the concurrent time by using a target CCA threshold corresponding to the STA 2.

Step 407: The AP 2 updates the concurrent group information, where the updated concurrent group information includes an identifier of the AP 2 and an identifier of the STA 2, and sends the updated concurrent group information to the AP 1 and the AP 3.

Actually, in the process of performing step 403 to step 407 by the AP 2, the AP 3 also performs the foregoing steps at the same time. It is assumed that the AP 3 determines to join the concurrent group, selects a STA 3 as a concurrent STA to join the concurrent group, updates the concurrent group information, and adds identifiers of the AP 3 and the STA 3 to the concurrent group information. Normally, after updating the concurrent group information, the AP 3 sends the updated concurrent group information to the AP 1 and the AP 2. If before sending the updated concurrent group message, the AP 3 also receives the concurrent group information sent by the AP 2, the AP 3 does not send the updated concurrent group message. Because times needed by a BSS 2 and a BSS 3 to join a concurrent group are different, if the BSS 2 first completes a joining process, the AP 2 preferentially sends the updated concurrent group information to the AP 1 and the AP 3. If after receiving the concurrent group information sent by the AP 2, the AP 1 finds that the AP 1 already joins the concurrent group, the AP 1 does not process the concurrent group information sent by the AP 2. If after receiving the concurrent group information sent by the AP 2, the AP 3 finds that the AP 2 also joins the concurrent group, the AP 3 completes the previous measurement process of receiving the concurrent information sent by the AP 1, and determines again, according to the concurrent group information sent by the AP 2, whether the AP 3 joins the concurrent group.

After the AP 3 joins the concurrent group information according to the concurrent group information sent by the AP 2, the concurrent group is formed. The concurrent group includes three BSSs in total. The STA 1, the STA 2, and the STA 3 respectively increase CCA thresholds of the STA 1, the STA 2, and the STA 3 to the target CCA threshold at a start moment of the concurrent time. Within the concurrent time, the STA 1, the STA 2, and the STA 3 perform channel contention by using the target CCA threshold. After obtaining channels through contention, the STA 1, the STA 2, and the STA 3 may perform concurrent communication within the concurrent time by using the channels. When the concurrent STAs in the concurrent group perform concurrent communication within the concurrent time, mutual interference between the concurrent STAs is very small.

Figure 9:
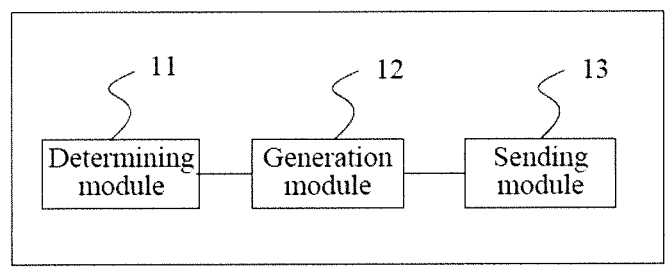
FIG. 9 is a schematic structural diagram of an AP according to Embodiment 5 of the present invention.

FIG. 9 is a schematic structural diagram of an AP according to Embodiment 5 of the present invention. As shown in FIG. 9, the AP in this embodiment includes: a determining module 11, a generation module 12, and a sending module 13, where the determining module 11 is configured to determine, from all stations STAs associated with the AP, a concurrent STA joining a concurrent group;

the generation module 12 is configured to generate concurrent group information of the concurrent group, where the concurrent group information includes an identifier of the AP, an identifier of the concurrent STA associated with the AP, and a concurrent time of the concurrent group;

the sending module 13 is configured to send a notification message to the concurrent STA associated with the AP, where the notification message includes the concurrent time and a target CCA threshold of the concurrent STA associated with the AP, and the notification message is used to instruct the concurrent STA associated with the AP to perform channel contention within the concurrent time by using the target CCA threshold; and the sending module 13 is further configured to send the concurrent group information to another AP in a system other than the AP.

In this embodiment, the determining module 11 may specifically determine the concurrent STA in the following manners. A first manner is: measuring received signal strengths from all the STAs associated with the AP to the AP; and then selecting one or more STAs with highest received signal strengths from all the STAs associated with the AP as the concurrent STA of the AP. A second manner is: the determining module 11 randomly selects one or more STAs from all the STAs associated with the AP as the concurrent STAs of the AP. A third manner is: the determining module 11 selects, according to a priority order of the STAs, one or more STAs from all the STAs associated with the AP as the concurrent STAs of the AP, and the determining module 11 preferentially selects a STA having a high priority as the concurrent STA.

Optionally, the concurrent group information further includes a maximum concurrent service set quantity, where the maximum concurrent service set quantity is used to instruct the another AP to stop joining the concurrent group when the another AP determines that a quantity of service sets that have already joined the concurrent group reaches the maximum concurrent service set quantity. After receiving concurrent group information sent by another AP, an AP first determines whether a quantity of service sets that have already joined the concurrent group is less than the maximum concurrent service set quantity. If the quantity of the service sets that have already joined the concurrent group is less than the maximum concurrent service set quantity, the AP further determines whether to join the concurrent group. If the quantity of the service sets that have already joined the concurrent group is equal to the maximum concurrent service set quantity, the AP stops joining the concurrent group.

Certainly the concurrent group information may not carry the maximum concurrent service set quantity. When receiving concurrent group information sent by another AP, an AP determines whether a current time reaches the concurrent time included in the concurrent group information. If the current time does not reach the concurrent time, the AP further determines whether to join the concurrent group. If the current time already reaches the concurrent time, the AP stops joining the concurrent group.

Optionally, the concurrent group information further includes an identifier of the concurrent group.

The AP in this embodiment may be used to execute the technical solutions provided in Embodiment 1 and Embodiment 4. The implementation principles and technical effects thereof are similar, and are not described herein again.

Figure 10:
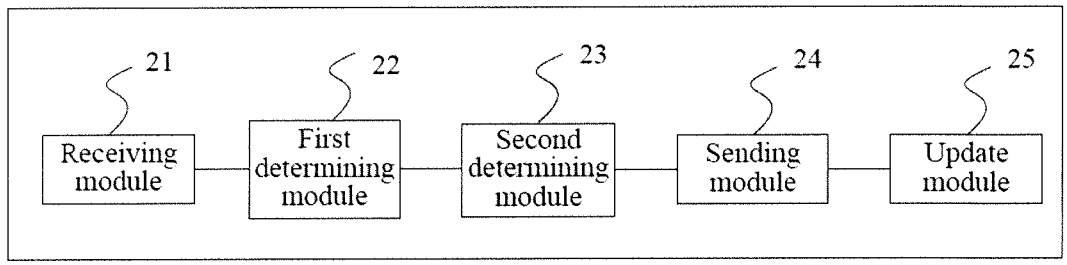
FIG. 10 is a schematic structural diagram of an AP according to Embodiment 6 of the present invention.

FIG. 10 is a schematic structural diagram of an AP according to Embodiment 6 of the present invention. The AP in this embodiment is used as a first AP. As shown in FIG. 10, the first AP provided in this embodiment includes: a receiving module 21, a first determining module 22, a second determining module 23, a sending module 24, and an update module 25, where the receiving module 21 is configured to receive concurrent group information of a concurrent group, where the concurrent group information includes: an identifier of each second AP that has already joined the concurrent group, an identifier of a concurrent station STA associated with each second AP, and a concurrent time of the concurrent group;

the first determining module 22 is configured to determine, according to the identifier, which is indicated by the concurrent group information, of the concurrent STA associated with each second AP, whether to join the concurrent group;

the second determining module 23 is configured to: if the first determining module determines that the first AP determines to join the concurrent group, determine, from all STAs associated with the first AP, according to the identifier of each second AP, a concurrent STA joining the concurrent group;

the sending module 24 is configured to send a notification message to the concurrent STA associated with the first AP, where the notification message includes the concurrent time and a target CCA threshold of the concurrent STA associated with the first AP, and the second notification message is used to instruct the concurrent STA associated with the first AP to perform channel contention within the concurrent time by using the target CCA threshold;

the update module 25 is configured to update the concurrent group information, where the updated concurrent group information includes an identifier of the first AP and an identifier of the concurrent STA associated with the first AP; and the sending module 24 is further configured to send the updated concurrent group information to another AP in a system other than the first AP.

Optionally, the first determining module 22 is specifically configured to: separately measure, according to the identifier of the concurrent STA associated with each second AP, a received signal strength from the concurrent STA associated with each second AP: then separately determine whether the received signal strength from the concurrent STA associated with each second AP is less than a preset received signal strength threshold corresponding to the concurrent STA associated with each second AP; and if the received signal strength from the concurrent STA associated with each second AP is less than the received signal strength threshold corresponding to the concurrent STA associated with each second AP, determine to join the concurrent group. Alternatively, the first determining module 22 obtains, according to the identifier of the concurrent STA associated with each second AP, a distance from the first AP to the concurrent STA associated with each second AP, and determines, according to the distance from the first AP to the concurrent STA associated with each second AP, whether to join the concurrent group.

Optionally, the second determining module 23 is specifically configured to: send a measurement indication message to all the STAs associated with the first AP, where the measurement indication message includes the identifier of each second AP, and the measurement indication message is used to instruct all the STAs associated with the first AP to measure received signal strength from each second AP, and receive the received signal strengths that are from the second APs and that are returned by all the STAs associated with the first AP, and select, from all the STAs associated with the first AP, one or more STAs having relatively low received signal strengths from the second APs as the concurrent STAs of the first AP. Alternatively, the second determining module 23 randomly selects one or more STAs from all the STAs associated with the AP as the concurrent STAs of the AP. Alternatively, the second determining module 23 selects, according to a priority order of the STAs, one or more STAs having high priorities from all the STAs associated with the AP as the concurrent STAs of the AP.

Optionally, the concurrent group information includes a maximum concurrent service set quantity, and correspondingly, the first determining module 22 is further configured to: determine whether a quantity of second APs that have already joined the concurrent group is less than the maximum concurrent service set quantity; and if the quantity of the second APs that have already joined the concurrent group is less than the maximum concurrent service set quantity, determine, according to the identifier of the concurrent STA associated with each second AP, whether the first AP joins the concurrent group. If the quantity of the second APs that have already joined the concurrent group is equal to the maximum concurrent service set quantity, the first determining module 22 determines that the first AP stops joining the concurrent group.

Optionally, if the concurrent group information does not include the maximum concurrent service set quantity, the first determining module 22 is further configured to: determine whether a current time reaches the concurrent time; and if the current time does not reach the concurrent time, determine, according to the identifier of the concurrent STA associated with each second AP, whether the first AP joins the concurrent group. If the current time reaches the concurrent time, the first determining module determines that the first AP stops joining the concurrent group.

Optionally, the concurrent group information further includes an identifier of the concurrent group.

The first AP in this embodiment may be used to execute the technical solutions provided in Embodiment 2 and Embodiment 4. The implementation principles and technical effects thereof are similar, and are not described herein again.

Figure 11:
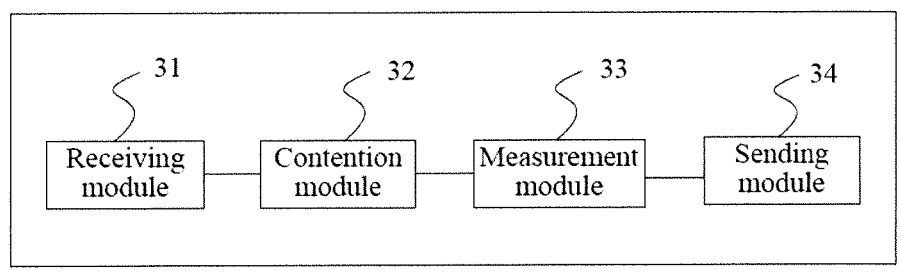
FIG. 11 is a schematic structural diagram of a STA according to Embodiment 7 of the present invention.

FIG. 11 is a schematic structural diagram of a STA according to Embodiment 7 of the present invention. As shown in FIG. 11, the STA in this embodiment includes: a receiving module 31 and a contention module 32, where the receiving module 31 is configured to receive a notification message sent by an access point AP, where the STA is a concurrent STA associated with the AP, the notification message is sent by the AP to the STA after the AP determines that the STA joins a concurrent group, and the notification message includes a concurrent time of the concurrent group and a target CCA threshold of the STA; and the contention module 32 is configured to perform channel contention according to the notification message within the concurrent time by using the target CCA threshold.

The receiving module 31 is further configured to: receive a measurement indication message sent by the AP, where the measurement indication message includes an identifier of each second AP that has already joined the concurrent group, and the measurement indication message is used to instruct the STA to measure a received signal strength from each second AP; and correspondingly, the STA further includes: a measurement module 33 and a sending module 34, where the measurement module 33 is configured to measure the received signal strength from each second AP according to the identifier of each second AP included in the measurement indication message; and the sending module 34 is configured to send, to the AP, the received signal strength that is from each second AP, so that the AP determines, according to the received signal strength from each second AP, whether the STA joins the concurrent group.

The STA in this embodiment may be used to execute the technical solutions provided in Embodiment 3 and Embodiment 4. The implementation principles and technical effects thereof are similar, and are not described herein again.

Figure 12:
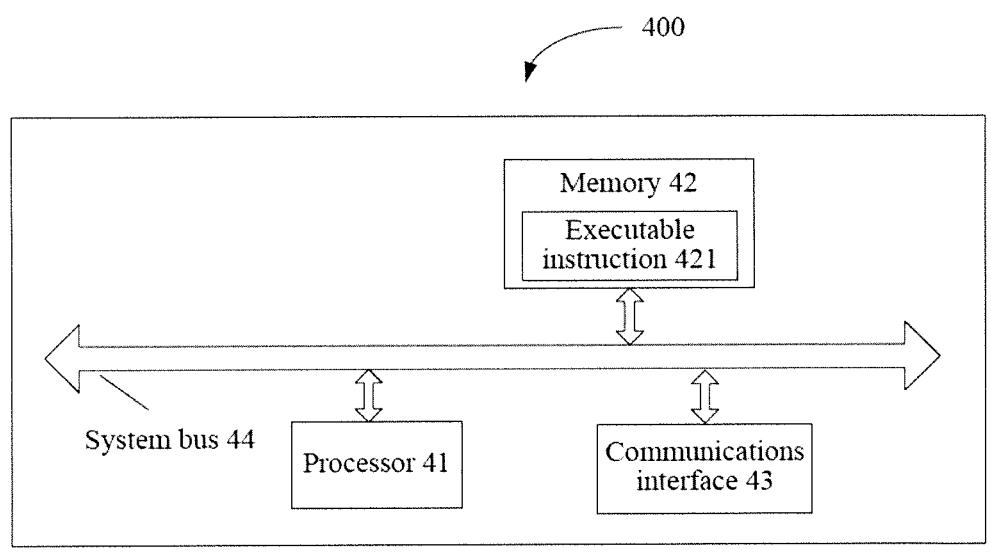
FIG. 12 is a schematic structural diagram of an AP communications apparatus according to Embodiment 8 of the present invention.

FIG. 12 is a schematic structural diagram of an AP communications apparatus according to Embodiment 8 of the present invention. As shown in FIG. 12, the AP communications apparatus 400 in this embodiment includes: a processor 41, a memory 42, a communications interface 43, and a system bus 44, where the memory 42 and the communications interface 43 are connected to and communicate with the processor 41 by using the system bus 44; the communications interface 43 is configured to communicate with another device; the memory 42 stores a computer executable instruction 421; and the processor 41 is configured to run the executable instruction 421, so that the AP 400 performs the following method:

determining, from all stations STAs associated with the AP, a concurrent STA joining a concurrent group, and generating concurrent group information of the concurrent group, where the concurrent group information includes an identifier of the AP, an identifier of the concurrent STA associated with the AP, and a concurrent time of the concurrent group;

sending a notification message to the concurrent STA associated with the AP, where the notification message includes the concurrent time and a target CCA threshold of the concurrent STA associated with the AP, and the notification message is used to instruct the concurrent STA associated with the AP to perform channel contention within the concurrent time by using the target CCA threshold; and sending the concurrent group information to another AP in a system other than the AP.

Optionally, the determining, by the processor 41 from all stations STAs associated with the AP, a concurrent STA joining a concurrent group is specifically: measuring received signal strengths from all the STAs associated with the AP to the AP; and selecting one or more STAs with highest received signal strengths from all the STAs associated with the AP as the concurrent STA of the AP.

Optionally, the concurrent group information further includes a maximum concurrent service set quantity, where the maximum concurrent service set quantity is used to instruct the another AP to stop joining the concurrent group when the another AP determines that a quantity of service sets that have already joined the concurrent group reaches the maximum concurrent service set quantity.

Optionally, the concurrent group information further includes an identifier of the concurrent group.

The AP communications apparatus in this embodiment may be used to execute the technical solutions provided in Embodiment 1 and Embodiment 4. The implementation principles and technical effects thereof are similar, and are not described herein again.

Figure 13:
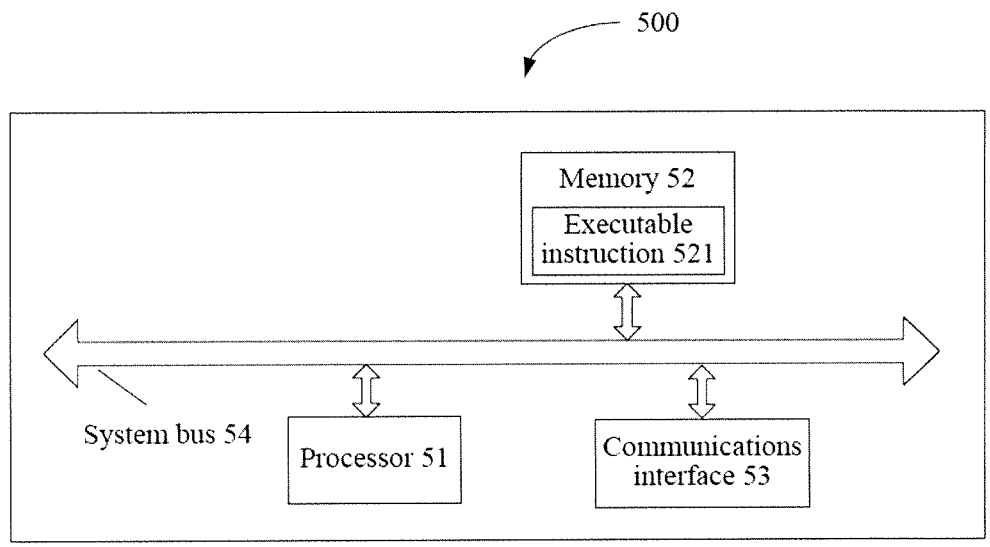
FIG. 13 is a schematic structural diagram of a first AP communications apparatus according to Embodiment 9 of the present invention.

FIG. 13 is a schematic structural diagram of a first AP communications apparatus according to Embodiment 9 of the present invention. As shown in FIG. 13, the first AP communications apparatus 500 in this embodiment includes: a processor 51, a memory 52, a communications interface 53, and a system bus 54, where the memory 52 and the communications interface 53 are connected to and communicate with the processor 51 by using the system bus 54; the communications interface 53 is configured to communicate with another device; the memory 52 stores a computer executable instruction 521; and the processor 51 is configured to run the computer executable instruction 521, so that the first AP communications apparatus 500 performs the following method:

receiving concurrent group information of a concurrent group, where the concurrent group information includes: an identifier of each second AP that has already joined the concurrent group, an identifier of a concurrent station STA associated with each second AP, and a concurrent time of the concurrent group;

determining, according to the identifier, which is indicated by the concurrent group information, of the concurrent STA associated with each second AP, whether the first AP joins the concurrent group;

if it is determined that the first AP joins the concurrent group, determining, from all STAs associated with the first AP, according to the identifier of each second AP, a concurrent STA joining the concurrent group;

sending a notification message to the concurrent STA associated with the first AP, where the notification message includes the concurrent time and a target CCA threshold of the concurrent STA associated with the first AP, and the second notification message is used to instruct the concurrent STA associated with the first AP to perform channel contention within the concurrent time by using the target CCA threshold; and updating the concurrent group information, where the updated concurrent group information includes an identifier of the first AP and an identifier of the concurrent STA associated with the first AP, and sending the updated concurrent group information to another AP in a system other than the first AP.

Optionally, the determining, by the processor 51 according to the identifier of the concurrent STA associated with each second AP, whether the first AP joins the concurrent group is specifically: separately measuring, according to the identifier of the concurrent STA associated with each second AP, a received signal strength from the concurrent STA associated with each second AP; separately determining whether the received signal strength from the concurrent STA associated with each second AP is less than a preset received signal strength threshold corresponding to the concurrent STA associated with each second AP; and if the received signal strength from the concurrent STA associated with each second AP is less than the received signal strength threshold corresponding to the concurrent STA associated with each second AP, determining that the first AP joins the concurrent group.

Optionally, the determining, by the processor 51 from all STAs associated with the first AP, according to the identifier of each second AP, a concurrent STA joining the concurrent group is specifically: sending a measurement indication message to all the STAs associated with the first AP, where the measurement indication message includes the identifier of each second AP, and the measurement indication message is used to instruct all the STAs associated with the first AP to measure received signal strength from each second AP; and receiving the received signal strengths that are from the second APs and that are returned by all the STAs associated with the first AP, and selecting, from all the STAs associated with the first AP, one or more STAs having relatively low received signal strengths from the second APs as the concurrent STAs of the first AP.

Optionally, the concurrent group information includes a maximum concurrent service set quantity, and correspondingly, before the processor 51 determines, according to the identifier of the concurrent STA associated with each second AP, whether the first AP joins the concurrent group, the processor 51 determines whether a quantity of second APs that have already joined the concurrent group is less than the maximum concurrent service set quantity, if the quantity of the second APs that have already joined the concurrent group is less than the maximum concurrent service set quantity, determines, according to the identifier of the concurrent STA associated with each second AP, whether the first AP joins the concurrent group; and if the quantity of the second APs that have already joined the concurrent group is equal to the maximum concurrent service set quantity, determines that the first AP stops joining the concurrent group.

Optionally, before the processor 51 determines, according to the identifier of the concurrent STA associated with each second AP, whether the first AP joins the concurrent group, the processor 51 determines whether a current time reaches the concurrent time: if the current time does not reach the concurrent time, determines, according to the identifier of the concurrent STA associated with each second AP, whether the first AP joins the concurrent group; and if the current time reaches the concurrent time, determines that the first AP stops joining the concurrent group.

Optionally, the concurrent group information further includes an identifier of the concurrent group.

The first AP communications apparatus in this embodiment may be used to execute the technical solutions provided in Embodiment 2 and Embodiment 4. The implementation principles and technical effects thereof are similar, and are not described herein again.

Figure 14:
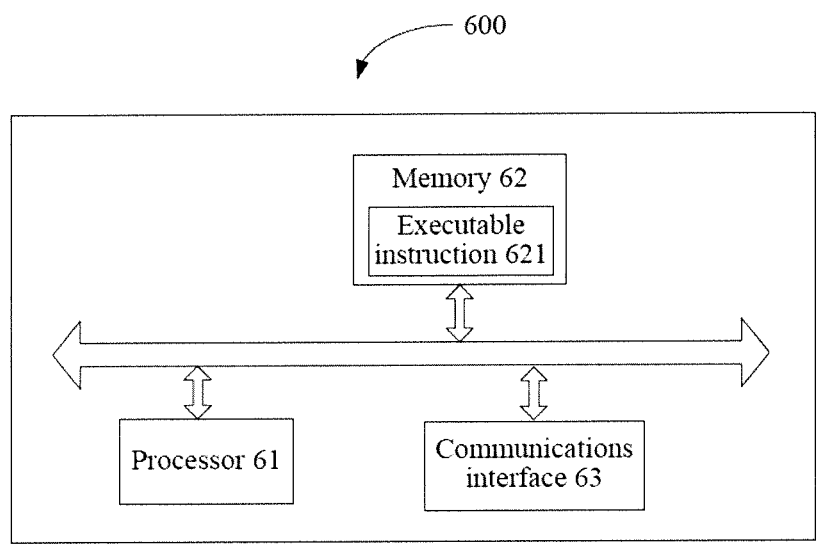
FIG. 14 is a schematic structural diagram of a communications apparatus according to Embodiment 10 of the present invention.

FIG. 14 is a schematic structural diagram of a communications apparatus according to Embodiment 10 of the present invention. As shown in FIG. 14, the communications apparatus 600 in this embodiment includes: a processor 61, a memory 62, and a communications interface 63, where the memory 62 and the communications interface 63 are connected to and communicate with the processor 61; the communications interface 63 is configured to communicate with another device; the memory 62 stores a computer executable instruction 621; and the processor 61 is configured to run the computer executable instruction 621, so that the communications apparatus 600 performs the following method for a STA:

receiving a notification message sent by an access point AP, where the STA is a concurrent STA associated with the AP, the notification message is sent by the AP to the STA after the AP determines that the STA joins a concurrent group, and the notification message includes a concurrent time of the concurrent group and a target CCA threshold of the STA; and performing channel contention according to the notification message within the concurrent time by using the target CCA threshold.

Further, before the station STA receives the notification message sent by the access point AP, the processor 61 is further configured to: receive a measurement indication message sent by the AP, where the measurement indication message includes an identifier of each second AP that has already joined the concurrent group, and the measurement indication message is used to instruct the STA to measure a received signal strength from each second AP: measure the received signal strength from each second AP according to the identifier of each second AP included in the measurement indication message; and send, to the AP, the received signal strength that is from each second AP, so that the AP determines, according to the received signal strength from each second AP, whether the STA joins the concurrent group.

The STA in this embodiment may be used to execute the technical solutions provided in Embodiment 3 and Embodiment 4. The implementation principles and technical effects thereof are similar, and are not described herein again.

The embodiments in this specification are all described in a progressive manner, for same or similar parts in the embodiments, reference may be made to these embodiments, and each embodiment focuses on a difference from other embodiments. The apparatus provided in the embodiments is described relatively simply because it corresponds to the method provided in the embodiments, and for portions related to those of the method, reference may be made to the description of the method.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

With the foregoing description of the embodiments, it may be clearly understood by persons skilled in the art that the implementation manners of the present invention may be implemented by software plus necessary universal hardware, where the universal hardware includes a universal integrated circuit, a universal CPU, a universal memory, a universal device, and the like, and definitely may also be implemented by application-specific hardware, including an application-specific integrated circuit, an application-specific CPU, an application-specific memory, an application-specific device, and the like, but in many cases, the former one is preferred. Based on such understandings, the essence of the technical solutions of the present invention or the part that makes contributions to the prior art can be embodied in a software product. The computer software product may be stored in a readable storage medium such as a USB flash disk, a mobile hard disk, a read-only memory (ROM, Read-Only Memory), a random access memory (RAM, Random Access Memory), a magnetic disk, or an optical disc, where the storage medium incorporates several instructions causing a computer device (such as a personal computer, a server, or a network device) to perform the method specified in each embodiment of the present invention.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for adjusting a clear channel assessment (CCA) threshold, comprising:
    creating, by an access point (AP), a concurrent group by selecting a plurality of concurrent stations (STAs) from among all STAs associated with the AP to join the concurrent group;
    generating concurrent group information of the concurrent group, wherein the concurrent group information comprises an identifier of the AP, an identifier for each of the plurality of concurrent STAs associated with the AP, and a concurrent time of the concurrent group;
    sending, by the AP, a notification message to each of the plurality of concurrent STAs associated with the AP, wherein the notification message comprises the concurrent time and a target CCA threshold of the plurality of concurrent STAs associated with the AP, the notification message instructing the plurality of concurrent STAs associated with the AP to perform channel contention within the concurrent time by using the target CCA threshold, the target CCA threshold having a higher value than a CCA threshold used to perform channel contention during the concurrent time by remaining STAs from among all the STAs associated with the AP which are not selected to join the concurrent group; and
    sending, by the AP, the concurrent group information to another AP in a system other than the AP.

2. The method according to claim 1, wherein the selecting the plurality of concurrent STAs from among all STAs associated with the AP comprises:
    measuring, by the AP, received signal strengths from all the STAs associated with the AP to the AP; and
    selecting, by the AP, STAs with highest received signal strengths from among all the STAs associated with the AP as the plurality of concurrent STAs of the AP.

3. The method according to claim 1, wherein
    the concurrent group information further comprises a maximum concurrent service set quantity, and
    the maximum concurrent service set quantity instructs the another AP to not join the concurrent group when the another AP determines that a quantity of service sets that have already joined the concurrent group has reached the maximum concurrent service set quantity.

4. The method according to claim 1, wherein the concurrent group information further comprises an identifier of the concurrent group.

5. A method for adjusting a clear channel assessment (CCA). threshold, comprising:
   receiving, by a first access point (AP), concurrent group information of a concurrent group, wherein the concurrent group information comprises: an identifier of a second AP that has already joined the concurrent group, an identifier for each of a plurality of concurrent stations (STAs) associated with the second AP, and a concurrent time of the concurrent group;
   determining, by the first AP according to the identifier for each of the plurality of concurrent STAs associated with the second AP, which is included in the concurrent group information, whether to join the concurrent group;
   if the first AP determines to join the concurrent group, selecting, by the first AP from among all STAs associated with the first AP, according to the identifier of the second AP, at least one concurrent STA to join the concurrent group;
   sending, by the first AP, a notification message to the at least one concurrent STA associated with the first AP, wherein the notification message comprises the concurrent time and a target CCA threshold of the at least one concurrent STA associated with the first AP, the notification message instructing the at least one concurrent STA associated with the first AP to perform channel contention within the concurrent time by using the target CCA threshold, the target CCA threshold having a higher value than a CCA threshold used to perform channel contention during the concurrent time by remaining STAs from among all the STAs associated with the first AP which are not selected to join the concurrent group; and
   updating, by the first AP, the concurrent group information, wherein the updated concurrent group information comprises an identifier of the first AP and an identifier of the at least one concurrent STA associated with the first AP, and sending the updated concurrent group information to another AP in a system other than the first AP.

6. The method according to claim 5, wherein the determining, by the first AP according to the identifier for each of the plurality of concurrent STAs associated with the second AP, whether to join the concurrent group comprises:
   separately measuring, by the first AP according to the identifier for each of the plurality of concurrent STAs associated with the second AP, a received signal strength from the plurality of concurrent STAs associated with the second AP;
   separately determining, by the first AP, whether the received signal strength from the plurality of concurrent STAs associated with the second AP is less than a preset received signal strength threshold corresponding to the plurality of concurrent STAs associated with the second AP; and
   if the received signal strength from the plurality of concurrent STAs associated with the second AP is less than the received signal strength threshold, determining, by the first AP, to join the concurrent group.

7. The method according to claim 5, wherein the selecting, by the first AP from all STAs associated with the first AP, according to the identifier of the second AP, at least one concurrent STA to join the concurrent group comprises:
   sending, by the first AP, a measurement indication message to all the STAs associated with the first AP, wherein the measurement indication message comprises the identifier of the second AP, the measurement indication message instructing all the STAs associated with the first AP to measure received signal strength from the second AP; and
   receiving, by the first AP, the received signal strengths that are from the second AP and that are returned by all the STAs associated with the first AP, and selecting, from among all the STAs associated with the first AP, one or more STAs having relatively low received signal strengths from the second AP as the at least one concurrent STA to join the concurrent group.

8. The method according to claim 5, wherein the concurrent group information comprises a maximum concurrent service set quantity, and before the determining, by the first AP according to the identifier for each of the plurality of concurrent STAs associated with the second AP, whether to join the concurrent group, the method further comprises:
   determining, by the first AP, whether a quantity of APs that have already joined the concurrent group is less than the maximum concurrent service set quantity; and
   if the quantity of the APs that have already joined the concurrent group is less than the maximum concurrent service set quantity, determining, by the first AP according to the identifier for each of the plurality of concurrent STAs associated with the second AP, whether to join the concurrent group.

9. A method for adjusting a clear channel assessment (CCA) threshold, comprising:
   receiving, by a station (STA), a notification message sent by an access point (AP), wherein the STA is a concurrent STA associated with the AP from among all STAs associated with the AP, the notification message being sent by the AP to the STA after the AP selects the STA to join a concurrent group, and the notification message comprises a concurrent time of the concurrent group and a target CCA threshold of the STA, the target CCA threshold having a higher value than a CCA threshold used to perform channel contention during the concurrent time by remaining STAs from among all the STAs associated with the AP which are not selected by the AP to join the concurrent group; and
   performing, by the STA, channel contention according to the notification message within the concurrent time by using the target CCA threshold.

10. The method according to claim 9, wherein before the receiving, by the STA, the notification message sent by the AP, the method further comprises:
    receiving, by the STA, a measurement indication message sent by the AP, wherein the measurement indication message includes an identifier of a second AP that has already joined the concurrent group, the measurement indication message instructing the STA to measure a received signal strength from the second AP;
    measuring, by the STA, the received signal strength from the second AP according to the identifier of the second AP included in the measurement indication message; and
    sending, by the STA to the AP, the received signal strength that is from the second AP, so that the AP determines, according to the received signal strength from the second AP, whether the STA joins the concurrent group.

11. An access point (AP), comprising:
    a system bus;
    a communications interface configured to communicate with another device;
    a memory configured to store one or more computer executable instructions; and a processor, connected to the communications interface and the memory via the system bus, configured to execute the one or more computer executable instructions to:
- create a concurrent group by selecting a plurality of concurrent stations (STAs), from among all STAs associated with the AP, to join the concurrent group,
- generate concurrent group information of the concurrent group, wherein the concurrent group information comprises an identifier of the AP, an identifier for each of the plurality of concurrent STAs associated with the AP, and a concurrent time of the concurrent group,
- send a notification message to each of the plurality of concurrent STAs associated with the AP, wherein the notification message comprises the concurrent time and a target clear channel assessment (CCA) threshold of the plurality of concurrent STAs associated with the AP, the notification message instructing the plurality of concurrent STAs associated with the AP to perform channel contention within the concurrent time by using the target CCA threshold, the target CCA threshold having a higher value than a CCA threshold used to perform channel contention during the concurrent time by remaining STAs from among all the STAs associated with the AP which are not selected to join the concurrent group, and
- send the concurrent group information to another AP in a system other than the AP.

12. The AP according to claim 11, wherein the processor is configured to execute the one or more computer executable instructions to select the plurality of concurrent STAs to join the concurrent group by:
- measuring, received signal strengths from all the STAs associated with the AP to the AP, and
- selecting STAs with highest received signal strengths from among all the STAs associated with the AP as the plurality of concurrent STAs of the AP.

13. The AP according to claim 11, wherein
the concurrent group information further comprises a maximum concurrent service set quantity, and
the maximum concurrent service set quantity instructs the another AP to not join the concurrent group when the another AP determines that a quantity of service sets that have already joined the concurrent group has reached the maximum concurrent service set quantity.

14. The AP according to claim 11, wherein the concurrent group information further comprises an identifier of the concurrent group.

15. A first access point (AP) comprising:
a system bus;
a communications interface configured to communicate with another device;
a memory configured to store one or more computer executable instructions; and
a processor, connected to the communications interface and the memory via the system bus, configured to execute the one or more computer executable instructions to:
- receive concurrent group information of a concurrent group, wherein the concurrent group information comprises: an identifier of a second AP that has already joined the concurrent group, an identifier for each of a plurality of concurrent stations (STAs) associated with the second AP, and a concurrent time of the concurrent group,
- determine, according to the identifier for each of the plurality of concurrent STAs associated with the second AP, which is included in the concurrent group information, whether to join the concurrent group,
- if the first AP determines to join the concurrent group, select, from among all STAs associated with the first AP, according to the identifier of the second AP, at least one concurrent STA to join the concurrent group,
- send a notification message to the at least one concurrent STA associated with the AP, wherein the notification message comprises the concurrent time and a target clear channel assessment (CCA) threshold of the at least one concurrent STA associated with the first AP, the notification message instructing the at least one concurrent STA associated with the first AP to perform channel contention within the concurrent time by using the target CCA threshold, the target CCA threshold having a higher value than a CCA threshold used to perform channel contention during the concurrent time by remaining STAs from among all the STAs associated with the first AP which are not selected to join the concurrent group, and
- update the concurrent group information, wherein the updated concurrent group information comprises an identifier of the first AP and an identifier of the at least one concurrent STA associated with the first AP, and
- send the updated concurrent group information to another AP in a system other than the first AP.

16. The first AP according to claim 15, wherein the processor is configured to execute the one or more computer executable instructions to determine, according to the identifier for each of the plurality of concurrent STAs associated with the second AP, whether to join the concurrent group by:
- separately measuring, according to the identifier for each of the plurality of concurrent STAs associated with the second AP, a received signal strength from the plurality of concurrent STAs associated with the second AP,
- separately determining, whether the received signal strength from the plurality of concurrent STAs associated with the second AP is less than a preset received signal strength threshold corresponding to the plurality of concurrent STAs associated with the second AP, and
- if the received signal strength from the plurality of concurrent STAs associated with the second AP is less than the received signal strength threshold, determining to join the concurrent group.

17. A station (STA), comprising:
a communications interface configured to communicate with another device;
a memory configured to store one or more computer executable instructions; and
a processor, connected to the communications interface and the memory, configured to execute the one or more computer executable instructions to:
- receive a notification message sent by an access point (AP), wherein the STA is a concurrent STA associated with the AP from among all STAs associated with the AP, the notification message being sent by the AP to the STA after the AP selects the STA to join a concurrent group, and the notification message comprises a concurrent time of the concurrent group and a target clear channel assessment (CCA) threshold of the STA, the target CCA threshold having a higher value than a CCA threshold used to perform channel contention during the concurrent time by remaining STAs from among all the STAs associated with the AP which are not selected by the AP to join the concurrent group, and perform channel contention according to the notification message within the concurrent time by using the target CCA threshold.

18. The STA according to claim 17, wherein before the STA receives the notification message sent by the AP, the processor is configured to execute the one or more computer executable instructions to:

receive a measurement indication message sent by the AP, wherein the measurement indication message includes an identifier of a second AP that has already joined the concurrent group, the measurement indication message instructing the STA to measure a received signal strength from the second AP, measure the received signal strength from the second AP according to the identifier of the second AP included in the measurement indication message, and send, to the AP, the received signal strength that is from the second AP, so that the AP determines, according to the received signal strength from the second AP, whether the STA joins the concurrent group.

* * * * *

UNITED STATES PATENT AND TRADEMARK OFFICE
CERTIFICATE OF CORRECTION

PATENT NO. : 10,440,743 B2
APPLICATION NO. : 15/446314
DATED : October 8, 2019
INVENTOR(S) : Jun Luo et al.

It is certified that error appears in the above-identified patent and that said Letters Patent is hereby corrected as shown below:

In the Claims

Column 29, Line 5, Claim 5, after "assessment" delete "(CCA)." and insert -- (CCA) --, therefor.

Column 31, Line 35, Claim 12, after "by:" delete "measuring," and insert -- measuring --, therefor.

Column 31, Line 51, Claim 15, after "point" delete "(AP)" and insert -- (AP), --, therefor.

Signed and Sealed this
Fourth Day of February, 2020

Andrei Iancu
*Director of the United States Patent and Trademark Office*